US007698288B2

(12) United States Patent
Kawabe et al.

(10) Patent No.: US 7,698,288 B2
(45) Date of Patent: Apr. 13, 2010

(54) STORAGE MEDIUM STORING DIRECTORY EDITING SUPPORT PROGRAM, DIRECTORY EDITING SUPPORT METHOD, AND DIRECTORY EDITING SUPPORT APPARATUS

(75) Inventors: Shigehisa Kawabe, Yokohama (JP); Shunichi Kojima, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 353 days.

(21) Appl. No.: 11/078,564

(22) Filed: Mar. 14, 2005

(65) Prior Publication Data
US 2006/0101036 A1 May 11, 2006

(30) Foreign Application Priority Data
Nov. 5, 2004 (JP) ............................. 2004-322787

(51) Int. Cl.
*G06F 7/00* (2006.01)
*G06F 17/00* (2006.01)
(52) U.S. Cl. ....................... 707/101; 715/234
(58) Field of Classification Search ............... None
See application file for complete search history.

(56) References Cited

U.S. PATENT DOCUMENTS

| | | | | |
|---|---|---|---|---|
| 5,935,210 | A * | 8/1999 | Stark | 709/224 |
| 6,430,575 | B1 * | 8/2002 | Dourish et al. | 707/200 |
| 6,654,737 | B1 * | 11/2003 | Nunez | 707/3 |
| 6,760,721 | B1 * | 7/2004 | Chasen et al. | 707/3 |
| 6,947,959 | B1 * | 9/2005 | Gill | 715/501.1 |
| 6,993,657 | B1 * | 1/2006 | Renner et al. | 713/182 |
| 2001/0018697 | A1 * | 8/2001 | Kunitake et al. | 707/517 |
| 2002/0049782 | A1 * | 4/2002 | Herzenberg et al. | 707/500.1 |
| 2002/0129000 | A1 * | 9/2002 | Pillai et al. | 707/1 |
| 2003/0041304 | A1 * | 2/2003 | Numata et al. | 715/513 |
| 2004/0010753 | A1 * | 1/2004 | Salter et al. | 715/513 |
| 2004/0103105 | A1 * | 5/2004 | Lindblad et al. | 707/100 |
| 2004/0133605 | A1 * | 7/2004 | Chang et al. | 707/104.1 |
| 2004/0230897 | A1 * | 11/2004 | Latzel | 715/513 |

FOREIGN PATENT DOCUMENTS

| | | |
|---|---|---|
| JP | A-2001-209641 | 8/2001 |
| JP | A-2004-086855 | 3/2004 |

OTHER PUBLICATIONS

Carole E. Mah, "Using XML to Describe a Document Hierarchy", Nov. 8, 2000, Archived at archive.org on Jan. 28, 2001, 5 pages.*
Stayton, "DocBook XSL: The Complete Guide", Published Sep. 2003, Archived at archive.org Feb.-Jun. 2004, Sagehill Enterprises, Second Edition, 48 pages.*

* cited by examiner

*Primary Examiner*—John R. Cottingham
*Assistant Examiner*—James E. Richardson
(74) *Attorney, Agent, or Firm*—Oliff & Berridge, PLC (57) ABSTRACT

A storage medium readable by a computer stores a program of instructions executable by the computer to perform a function for supporting editing of a hierarchical structure of a directory. The function includes: editing metadata including information relevant to the hierarchical structure of the directory; editing content data as contents of a document; analyzing the metadata; and creating a new hierarchical structure of the directory on the basis of a result of the analysis and the content data.

6 Claims, 8 Drawing Sheets

CONTENTS OF E0.xml (FOLDER OBJECT AS ROOT DIRECTORY)

```
<?xml version="1.0" encoding="shift_jis"?>
<!DOCTYPE folder SYSTEM "directory.dtd">
<folder title="root" id="root" description="SITE ROOT" layoutStructure="part_template.html" type="part">
    &E1;
    &E2;
</folder>
```

FIG. 2B

CONTENTS OF E1.xml (FOLDER OBJECT AND MEMBER OF FOLDER OBJECT E0)

```
<?xml version="1.0" encoding="shift_jis"?>
<!DOCTYPE folder SYSTEM "directory.dtd">
<folder title="HEADING 1" id="A1" description="CONTENT 1" layoutStructure="chapter_template.html" type="chapter">
    &E1-1;
    &E1-2;
    &E1-3;
</folders>
```

FIG. 2C

CONTENTS OF E1-2.xml (FILE OBJECT AND MEMBER OF FOLDER OBJECT E1)

```
<?xml version="1.0" encoding="shift_jis"?>
<!DOCTYPE properties SYSTEM "properties.dtd">
<file title="HEADING 1-1" id="B1-1" href="test.doc" description="FILE 1" type="section"/>
```

FIG. 2D

CONTENTS OF E1-3.xml (LINK OBJECT AND MEMBER OF FOLDER OBJECT E1)

```
<?xml version="1.0" encoding="shift_jis"?>
<!DOCTYPE properties SYSTEM "properties.dtd">
<link title="HEADING 1-2" id="B1-2" href="http://foo.fujixerox.co.jp/" description="LINK 1" type="section"/>
```

FIG. 2E

CONTENTS OF E2.xml (FOLDER OBJECT AND MEMBER OF FOLDER OBJECT E0)

```
<?xml version="1.0" encoding="shift_jis"?>
<!DOCTYPE folder SYSTEM "directory.dtd">
<folder title="HEADING 2" id="A2" description="CONTENT 2" layoutStructure="chapter_template.html" type="chapter">
    &E2-1;
    &E2-2;
    &E2-3;
</folders>
```

FIG. 2F

CONTENTS OF E2-2.xml (FILE OBJECT AND MEMBER OF FOLDER OBJECT E2)

```
<?xml version="1.0" encoding="shift_jis"?>
<!DOCTYPE properties SYSTEM "properties.dtd">
<file title="HEADING 2-1" id="B2-1" href="test.xls" description="FILE 2" type="section"/>
```

FIG. 2G

CONTENTS OF E2-3.xml (LINK OBJECT AND MEMBER OF FOLDER OBJECT E2)

```
<?xml version="1.0" encoding="shift_jis"?>
<!DOCTYPE properties SYSTEM "properties.dtd">
<shortcut title="HEADING 2-2" id="B2-2" refid="B1-2" description="SHORTCUT 1" type="section"/>
```

FIG. 3A

CONTENTS OF E1-1.xml (CONTENT DATA AND MEMBER OF FOLDER E1)

```
<?xml version="1.0" encoding="shift_jis"?>
<!DOCTYPE properties SYSTEM "properties.dtd">
<properties id="C1">
        <property name="logo">/properties/logo1.jpg</property>
        <property name="CONTACT ADDRESS">mailto:foo.foo@fujixerox.co.jp</property>
        <property name="copyright">2004 FujiXerox Co.,Ltd</property>
</properties>
```

FIG. 3B

CONTENTS OF E2-1.xml (CONTENT DATA AND MEMBER OF FOLDER E2)

```
<?xml version="1.0" encoding="shift_jis"?>
<!DOCTYPE properties SYSTEM "properties.dtd">
<properties id="C2">
        <property name="logo">/properties/logo2.jpg</property>
        <property name="CONTACT ADDRESS">mailto:bar.bar@fujixerox.co.jp</property>
        <property name="copyright">2004 FujiXerox Co.,Ltd</property>
</properties>
```

```xml
<?xml version="1.0" encoding="shift_jis"?>
<!DOCTYPE folder SYSTEM "directory.dtd">
<folder title="root" id="root" description="SITE ROOT" layoutStructure="part_template.html" type="part">
    <folder title="HEADING 1" id="A1" description="CONTENT 1" layoutStructure="chapter_template.html" type="chapter">
        <properties id="C1">
            <property name="logo">/properties/logo1.jpg</property>
            <property name="CONTACT ADDRESS">mailto:foo.loo@fujixerox.co.jp</property>
            <property name="copyright">2004 FujiXerox Co.,Ltd</property>
        </properties>
        <file title="HEADING 1-1" id="B1-2" href="test.doc" description="FILE 1" type="section"/>
        <link title="HEADING 1-2" id="B1-3" href="http://foo.fujixerox.co.jp/" description="LINK 1" type="section"/>
    </folders>
    <folder title="HEADING 2" id="A2" description="CONTENT 2" layoutStructure="chapter_template.html" type="chapter">
        <properties id="C2">
            <property name="logo">/properties/logo2.jpg</property>
            <property name="CONTACT ADDRESS">mailto:bar.bar@fujixerox.co.jp</property>
            <property name="copyright">2004 FujiXerox Co.,Ltd</property>
        </properties>
        <file title="HEADING 2-1" id="B2-1" href="test.xls" description="FILE 2" type="section"/>
        <shortcut title="HEADING 2-2" id="B2-2" refid="B1-2" description="SHORTCUT 1" type="section"/>
    </folders>
</folder>
```

FIG. 6

| ADDRESS | TAG | INDEX | TITLE | ID | EXPLANATION | TEMPLATE | FILE | URL | LOGO | CONTACT ADDRESS | COPYRIGHT |
|---|---|---|---|---|---|---|---|---|---|---|---|
| /1 | part | 1 | root | root | SITE ROOT | part_template.html | root.html | /root.html | | | |
| /1/1 | chapter | 1 | HEADING1 | A1 | CONTENT 1 | chapter_template.html | A1.html | /A1.html | /properties/logo1.jpg | mailto:foo.foo@fujixerox.co.jp | 2004 FujiXerox Co.,Ltd |
| /1/1/1 | section | 1 | HEADING1-1 | B1-1 | FILE 1 | | B1-1.doc | /B1-1.doc | | | |
| /1/1/2 | section | 2 | HEADING1-2 | B1-2 | LINK 1 | | | http://foo.fujixerox.co.jp/ | | | |
| /1/2 | chapter | 2 | HEADING2 | A2 | CONTENT 2 | chapter_template.html | A2.html | /A2.html | /properties/logo2.jpg | mailto:bar.bar@fujixerox.co.jp | 2004 FujiXerox Co.,Ltd |
| /1/2/1 | section | 1 | HEADING2-1 | B2-1 | FILE 2 | | B2-1.xls | /B2-1.xls | | | |
| /1/2/2 | section | 2 | HEADING2-2 | B2-2 | SHORTCUT 1 | | | /B1-1.doc | | | |

FIG. 7

```
CONTENTS OF part_template.html
<!DOCTYPE HTML PUBLIC "-//W3C//DTD HTML 4.0 Transitional//EN">
<html>
<head>
  <title>$part.title$</title>
</head>
<body>
<h1>$part.title$</h1>

<ul>
{{<li> <a href="$chapter.url$"> $chapter.title$</a></li>
}}</ul>

</body>
</html>

FORMAT RESULT FOR ID=root
<!DOCTYPE HTML PUBLIC "-//W3C//DTD HTML 4.0 Transitional//EN">
<html>
<head>
  <title>root</title>
</head>
<body>
<h1>root</h1>

<ul>
<li> <a href="/A1.html">HEADING 1</a></li>
<li> <a href="/A2.html">HEADING 2</a></li>
</ul>

</body>
</html>
```

FIG. 8

```
CONTENTS OF chapter_template.html
<!DOCTYPE HTML PUBLIC "-//W3C//DTD HTML 4.0 Transitional//EN">
<html>
<head>
  <title>$chapter.title$</title>
</head>
<body>
<h1> <img src=$chapter.logo$>$chapter.title$</h1>

<ul>
{{<li> <a href="$section.url$"> $section.title$</a></li>
}}</ul>

<HR>
<a href=$chapter.CONTACT ADDRESS$>CONTACT ADDRESS</a><br>
©,$chapter.copyright$
</body>
</html>

FORMAT RESULT FOR ID=A1
<!DOCTYPE HTML PUBLIC "-//W3C//DTD HTML 4.0 Transitional//EN">
<html>
<head>
  <title>HEADING 1</title>
</head>
<body>
<h1> <img src=/properties/logo1.jpg>HEADING 1</h1>

<ul>
<li> <a href="/B1-1.doc">HEADING 1-1</a></li>
<li> <a href="/B1-2.doc">HEADING 1-2</a></li>
</ul>

<HR>
<a href=mailto:foo.foo@fujixerox.co.jp>CONTACT ADDRESS</a><br>
©,2004 FujiXerox Co.,Ltd
</body>
</html>
```

FIG. 9  RELATED ART

```
<H1>NEW PRODUCT INFORMATION</H1>
<UL>
<LI> <A href=product1.html>PRODUCT 1</A></LI>
<LI> <A href=product2.html>PRODUCT 2</A></LI>
<LI> <A href=product3.html>PRODUCT 3</A></LI>
</UL>
```

STORAGE MEDIUM STORING DIRECTORY EDITING SUPPORT PROGRAM, DIRECTORY EDITING SUPPORT METHOD, AND DIRECTORY EDITING SUPPORT APPARATUS

BACKGROUND OF THE INVENTION (1) Field of the Invention

The present invention relates to a storage medium storing a directory editing support program, a directory editing support method, and a directory editing support apparatus, in which storage, editing and management of content are supported for a directory style content service to provide plural pieces of content by a hyperlink structure.

(2) Description of the Related Art

It is known to provide a service which provides plural pieces of content including various pieces of document information by a hyperlink structure. Especially, a Web site to which World Wide Web technology is applied is widely used in the Internet or Intranet. Content of such a Web site is provided in a hierarchical structure of one-level or multi-level directory by classifying the information contents (content data) to be provided into categories determined for respective objects and by providing hyperlinks between the categories. The service to provide content in such a mode is called the directory style content service. The hierarchical structure of the directory is created in a language such as, HTML which can describe the hierarchical structure.

Figure 9:
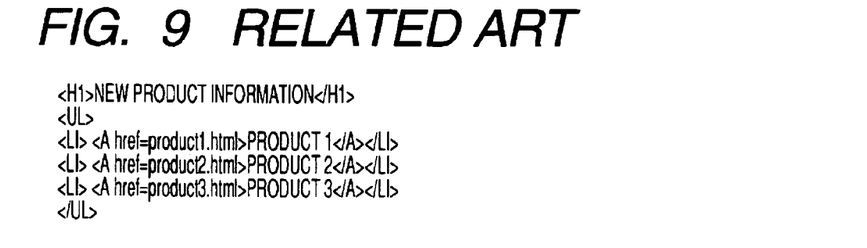
FIG. 9 is a view showing an example of a directory described in HTML in the related art.

FIG. 9 shows an example of a directory described in the HTML. In FIG. 9, "new product information" indicates the category, and product1.htm, product2.htm and product3.htm denote reference links to reference its destination content. By this, a hyperlink from the reference source (the category of "new product information" in this example) to another category is provided. Besides, "product 1", "product 2" and "product 3" are heading texts embedded in the reference source.

Conventionally, it is necessary that a management and operation responsible person who provides a directory style content service of a company issues new content frequently, and provides high quality also in the correctness of a reference link. Besides, the person must manage manyWebpages and office documents among Web sites of the Internet or portals of the intranet. Further, such navigation as to enable a user using the content service to reach objective content quickly (with a small number of clicks) must be performed.

In order to provide plural HTML files and content files mutually having reference links by the directory style content service, HTML files and document data are created, and are stored and managed in a repository, and after the administrator confirms reference destinations, categories and headings, they are installed in a Web server. In this case, the correction of the hierarchical structure of the directory is performed by rewriting the href attribute of the HTML, adding/deleting the A tag element, or correcting the heading text.

However, in the above related art, in the case where the hierarchical structure of the directory is corrected, it is necessary to rewrite the HTML, and there is a problem that expert knowledge is required, and the correction can not be easily performed.

SUMMARY OF THE INVENTION

The present invention has been made in view of the above circumstances and provides a storage medium storing a directory editing support program, a directory editing support method and a directory editing support apparatus, in which correction of a hierarchical structure of a directory can be easily performed.

According to an aspect of the present invention, the storage medium readable by a computer stores a program of instructions executable by the computer to perform a function for supporting editing of a hierarchical structure of a directory, the function includes: editing metadata including information relevant to the hierarchical structure of the directory; editing content data as contents of a document; analyzing the metadata; and creating a new hierarchical structure of the directory on the basis of a result of the analysis and the content data.

BRIEF DESCRIPTIONS OF THE DRAWINGS

Embodiments of the invention will be described in detail based on the following figures, wherein:

FIGS. 2A to 2G are views showing examples of metadata;

DETAILED DESCRIPTION OF THE INVENTION

Hereinafter, embodiments for carrying out the invention will be described with reference to the drawings.

Figure 1:
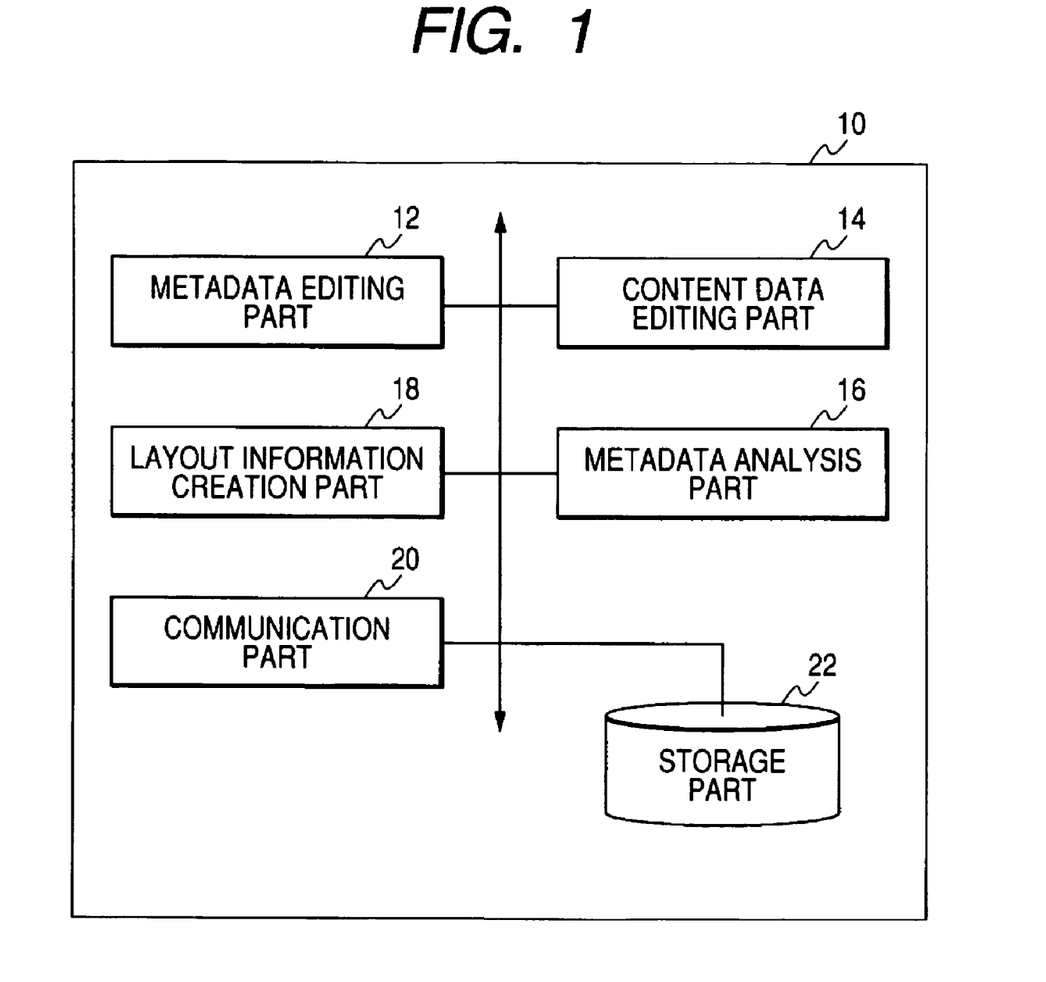
FIG. 1 is a block diagram of a structure of a directory editing support apparatus of the invention.

FIG. 1 is a block diagram of a structure of a directory editing support apparatus of the invention. In FIG. 1, a directory editing support apparatus 10 includes a metadata editing part 12, a content data editing part 14, a metadata analysis part 16, a layout information creation part 18, a communication part 20 and a storage part 22.

The metadata editing part 12 performs a processing to edit metadata and to store it into the storage part 22. Here, the metadata is attribute information relating to a document except the contents of the document, such as a heading to be embedded in a reference source of a document having a hyperlink structure as a hierarchical structure of a directory, an address of a document of a reference destination, an update date of the document, an author of the document, an explanation of the document, and a keyword, and is described in XML, HTML or the like which can express a hierarchical structure. Especially, the heading to be embedded in the reference source and the address of the document of the reference destination are indispensable items as the information relating to the hierarchical structure of the directory.

The content data editing part 14 executes an editing processing of content data. Here, the content data is data relating to the contents of the document.

The metadata analysis part 16 analyzes the metadata edited by the metadata editing part 12, and executes a processing to acquire data relating to the hierarchical structure of the directory.

On the basis of the data relating to the hierarchical structure of the directory acquired by the metadata analysis part 16 as a result of analyzing the metadata, the layout information creation part 18 converts the metadata and the content data into a format (for example, an HTML file) which can be browsed by a Web client, and determines the layout to display. At this conversion, for example, reference may be made to templates having specific layout structure information of documents.

The communication part 20 executes a processing to deliver the hierarchical structure of the directory converted into the HTML files through the network to a Web client.

The storage part 22 stores the metadata edited by the metadata editing part 12 and the content data edited by the content data editing part 14, and can be constructed of, for example, a temporally working RAM of a CPU, an EEPROM as a nonvolatile memory, a magnetic storage medium, or the like.

The directory editing support apparatus of this embodiment may be a storage medium storing a program to cause a computer mainly constructed of a CPU to be operated, and in this case, the CPU executes the program stored in a memory card or another medium, so that the respective functions of the apparatus are realized.

Next, the operation of the directory editing support apparatus shown in FIG. 1 will be described. In this embodiment, hyperlink structures between documents are regarded as a hierarchical structure of the directory, and attribute information to determine the hierarchical structure of the directory is contained in the metadata.

For example, in the case where a link is provided from a document (including metadata) A described in the HTML to another document B, the document A is regarded as a folder object, and the document B is made a member of the folder object. In the case where there is a link from the document B to a document C, the document B is regarded as a folder object, and the document C is made a member. In this case, the folder object holds, as an attribute value, heading information to be embedded in the reference source. In the case where the document C is the member of the document B, and the document A has a link to the document C, instead of making the document C the member of the document A, a shortcut object of the document C may be made the member of the document A. The shortcut object holds, as attribute values, heading information embedded in the reference source and an ID of the document of the reference destination.

A file imported from the outside through the communication part 20 is treated as a file object. The file object holds, as attribute values, heading information embedded in the reference source and address information to access an imported document.

Further, in the case where there is a link to information (document) managed by an external system, it is treated as a link object. The link object holds, as attribute values, heading information embedded in the reference source and an address of the external information.

When the metadata is edited by the metadata editing part 12 in FIG. 1, a specified folder object as the metadata is read out from the storage part 22, and in order to increase a member, a processing to add a folder object, a shortcut object, a link object, or a file object is executed. In order to delete a member, a processing to delete a folder object, a shortcut object, a link object or a file object, which is an existing member, is executed. Further, the metadata editing part 12 executes also a processing to change the attribute of the existing member folder object, the shortcut object, the link object, or the file object.

Besides, in order to enable plural editors to perform editing operations exclusively, when the metadata is read out from the storage part 22, a lock mechanism (to get a lock for editing or to release the lock) may be provided for each folder object. Incidentally, when the editing operations are performed by plural editors, according to circumstances, contradictory editing results can occur (for example, in the case where a folder as a member of any folder is deleted, or in the case where another editor edits a folder of a lower layer with respect to the deleted folder). Then, version management may be performed for the folder object, the short cut object, the link object, or the file object constituting the metadata. Specifically, each time the metadata is edited, a new version number is given to the editing result, and the editing result is stored as another file as distinguished from the result before the editing. Further, as the need arises, the version number is specified, and the metadata is extracted from the storage-part 22, so that the version management can be realized.

FIGS. 2A to 2G show examples of metadata edited in the manner as described above. The metadata is described in the XML.

FIG. 2A shows an example of a folder object expressing a root directory. FIG. 2B shows an example of a folder object E1 as a member of a folder object E0 as the root directory. FIG. 2C shows an example of a folder object E1-2 as a member of the folder object E1. FIG. 2D shows an example of a folder object E1-3 as a member of the folder object E1. FIG. 2E shows an example of a folder object E2 as a member of the folder object E0 as the root directory. FIG. 2F shows an example of a folder object E2-2 as a member of the folder object E2. FIG. 2G shows an example of a folder object E2-3 as a member of the folder object E2.

In the respective objects, each of them has heading information of the reference source as an attribute value of a "title" attribute. Besides, each has address information to access a document as an attribute value of a "href" attribute. Besides, each has an ID of the document of the reference destination as an attribute value of an "id" attribute.

Next, when the content data is edited by the content data editing part 14 in FIG. 1, a processing to read out an XML file expressing the content data from the storage part 22, to edit it by an XML editor, and to write it into the storage part 22 is performed. In this case, similarly to the metadata, editing may be exclusively performed, and version management may be performed.

Incidentally, instead of editing the content data by the XML editor, a method may be used in which the XML data is read out, it is converted into another format (for example, HTML) capable of editing an attribute key and an attribute value, the HTML is edited, and the editing result is made to be reflected in the XML data by a specified method.

Figure 3A:
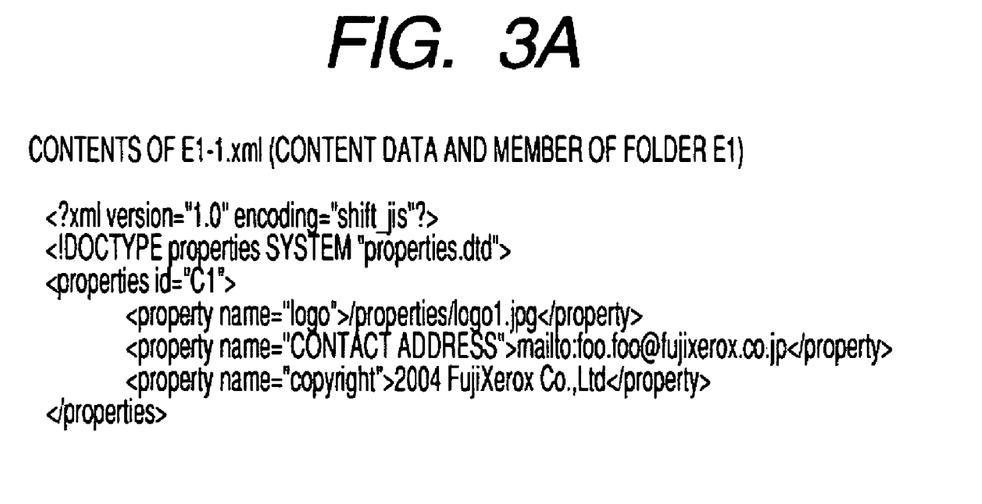
FIGS. 3A and 3B are views showing examples of content data.
Figure 3B:
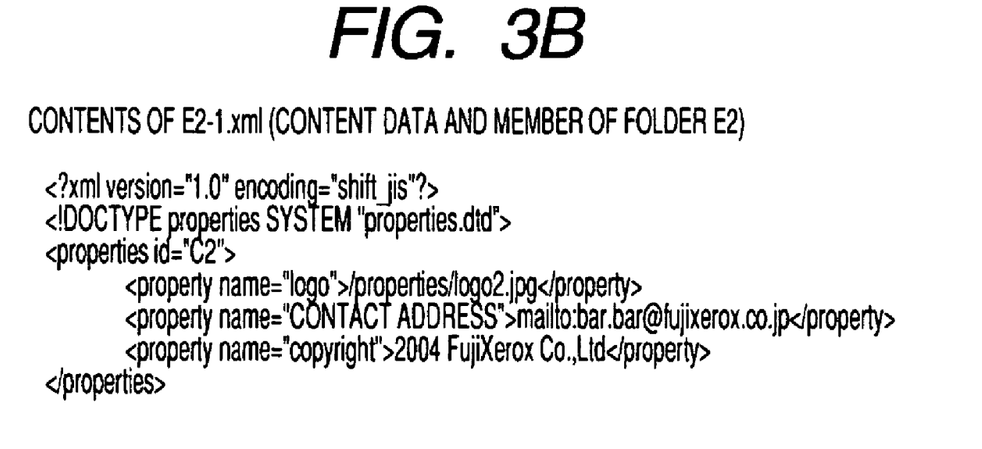

FIGS. 3A and 3B show examples of the content data edited in the manner as described above. Incidentally, the content data are described in the XML. In FIGS. 3A and 3B, although the content data are treated as attributes (members of the folder objects E1 and E2) accompanying the folder object, in order that editing can be performed independently of the folder object, they are expressed by different files, and are managed differently from the folder object.

Incidentally, in the content data, although a tagged character string as in the HTML may be directly stored, it can also be expressed by a pair of a content attribute key and a content value. In this case, the layout information creation part 18 performs a format processing on the basis of the attribute list of content attribute keys and content values, and creates, for example, an HTML file containing the content data.

In the examples shown in FIGS. 3A and 3B, a reference ID such as C1 or C2 is held by a "properties" attribute of the folder objects, and the correspondence between the content data and the folder object is expressed. Besides, in property, the content attribute key is specified in the name attribute, and the content value is specified as a content text.

Figure 4:
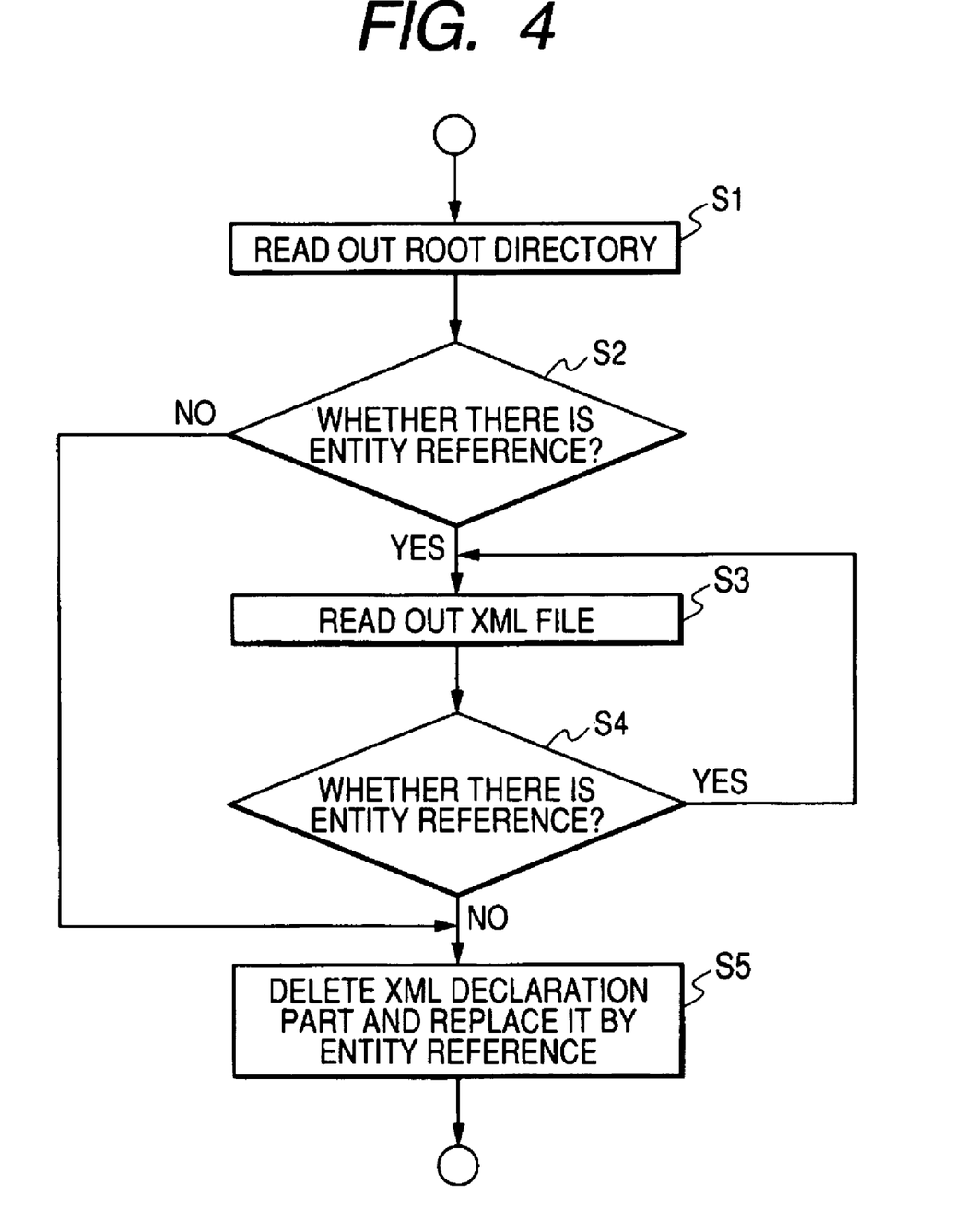
FIG. 4 is a view showing an example of an operation to create a file to be arranged in a Web site from metadata and content data by the directory editing support apparatus shown in FIG. 1.

FIG. 4 shows an example of an operation to create a file arranged in a Web site from the metadata and the content data by the directory editing support apparatus of this embodiment. In FIG. 4, the metadata analysis part 16 reads out the XML file (E0.xml) of the root directory (folder object E0) shown in FIG. 2 from the storage part 22 and parses it (S1).

Next, the metadata analysis part 16 checks whether a first entity reference (&E1; or &E2) exists in the read XML file (S2), and when the first entity reference is found, the corresponding XML file (E1.xml, E2.xml) is read out from the storage part 22 (S3).

Further, the metadata analysis part 16 checks whether a second entity reference (&E1-1; to &E1-3;, &E2-1; to &E2-3;) exists in the XML file read out at S3 (S4), and when the second entity reference is found, the operation from S3 is repeated.

When the first and the second entity references do not exist in the XML file read out from the storage part 22, the layout information creation part 18 replaces the entity reference by a text in which an XML declaration part is erased from the file content (S5).

By the above operation, the site XML file containing all the metadata and content data contained in the Web site can be structured from the XML file of the root directory of the site.

Figure 5:
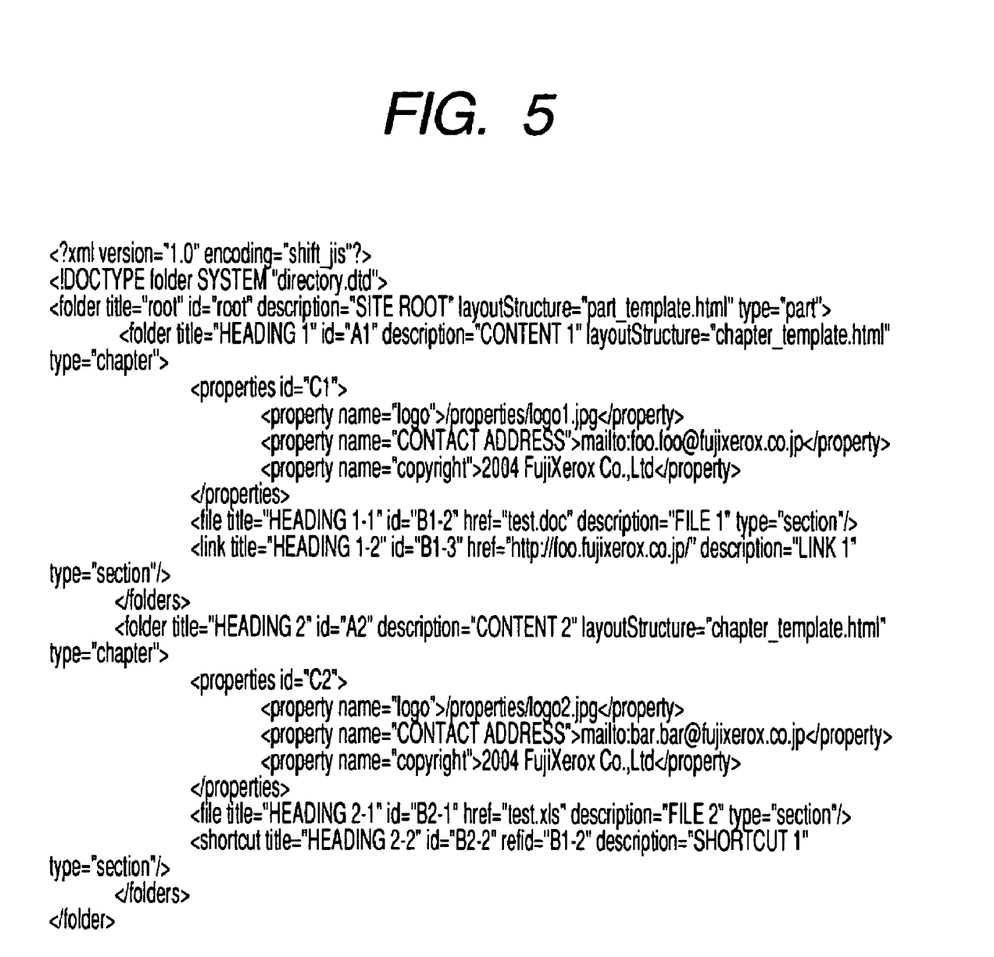
FIG. 5 is a view showing an example of a site SML file.

FIG. 5 shows an example of a site XML file created from the metadata shown in FIG. 2 and the content data shown in FIG. 3 by the process shown in FIG. 4.

Incidentally, when site XML files are created, approval management may be performed for each of the XML files. In this case, the administrator edits an approval attribute set for each XML file. In the case where this authorization attribute is "approved", the processing of S5 becomes a processing to replace the entity reference by the text in which the XML declaration part is erased from the file content. In the case where the approval attribute is "unapproved", it becomes a processing to simply delete the entity declaration. By this, the content editing of which is not completed and which is in the middle of editing, is managed by the administrator as the "unapproved" content, so that it is possible to prevent the content from being arranged in the Web site.

Besides, in the case where each XML file is version managed, the processing of S3 becomes a processing to extract an XML file whose approval attribute is "approved" and whose version is newest in XML files (E1.xml, E2.xml) corresponding to the entity reference from a metadata base. By this, the site XML file containing only the newest version can be structured.

Next, a description will be given to an operation in which the layout information creation part 18 converts the site XML file shown in FIG. 5 into plural arrangement files by using a layout template.

Figure 6:
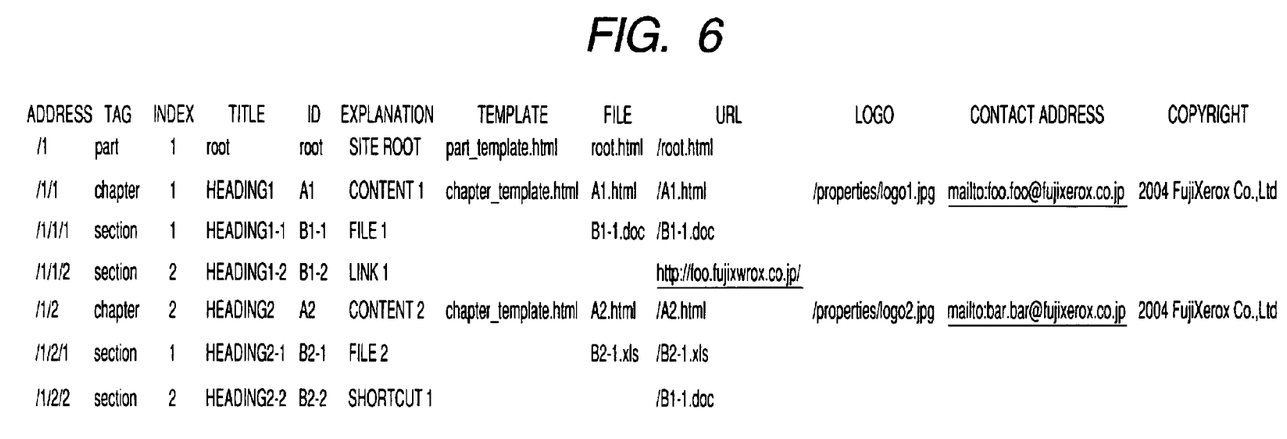
FIG. 6 is an explanatory view of contextual structure information.

First, the site XML file is analyzed, and contextual structure information shown in FIG. 6 is outputted.

An "address" column of this contextual structure information includes a character string in which the root directory is made "/1", and members immediately below the root directory are expressed as "/1/1", "/1/2" . . . That is, "/" immediately follows the address of a parent folder, and a brother number (from 1 to N, N is the number of members of the parent folder) follows it to create the address string. Besides, "index" is a numeral subsequent to "/" and appearing at the end of the address.

Besides, "tag" denotes a value of a type attribute contained in the site XML file. The contextual structure information is such that the "tag" is made a node, an analysis tree in which a tag name and an attribute value of the tag become an attribute of the node is created, and the node of the analysis tree is outputted from the root directory in order of depth first traversal so that it becomes data of one-line record format for each node. Accordingly, in the case where the type attribute is not set (portion of the site XML file corresponding to E1-1.xml, E2-1.xml as the content data), it is not outputted as a record shown in each line of FIG. 6.

Besides, "title" denotes a value of a title attribute contained in the site XML file, "ID" denotes a value of an id attribute, and "explanation" denotes a value of a description attribute.

Besides, "template" denotes a layout Structure attribute value contained in the site XML file.

Besides, "file" denotes a file name, and "url" denotes address information to access the content corresponding to the node. The file name and the url are created in a following manner. That is, in the folder object, "<id attribute value>.<extension>" is made the file name, and "/<id attribute value>.<extension>" is made the url. The "<extension>" is an extension of "template" (when the file name of the template is template1.html, the extension is "html"). Besides, in the file object, "<id attribute value>.<extension>" is made the file name, and "/<id attribute value>.<extension>" is made the url. The extension is made an extension of a file name of an imported file (when the file name is test.doc, the extension is "doc"). Besides, in the link object, "<href attribute value>" is made the url. A file name is not set. In the shortcut object, the url of the folder object, the file object, the link object or the shortcut object, indicated by a refid attribute value, is made the url. A file name is not set.

Besides, the name attribute of a property tag and the content contained in a portion corresponding to the content data are outputted as attributes of the parent folder object of the properties tag containing the property tag. That is, a column having a name attribute name as a column name is assigned to each of different name attributes of all the property tags contained in the site XML file, and in the case where the folder object is outputted, the content text of each property tag is outputted to the column position corresponding to the name attribute name. For example, in the contextual structure information, at a line whose address column is /1/1, the respective values of property elements of the content data set by E1-1.xml are set correspondingly at positions where the columns are indicated by logo, contact address, and copy right.

Next, the layout information creation part 18 converts the obtained contextual structure information into a format in which the Web client can browse, such as an HTML file, by using a template file. In this embodiment, as described above, since the template file is specified by the template attribute of the contextual structure information, with respect to a line on which the template file is specified, the specified template file is used to perform conversion into the HTML file or the like. With respect to the converted file, the file specified by a "file" attribute is copied into a specified directory of the Web server.

Incidentally, conversion into an HTML file by using a template file is disclosed in, for example, JP-A-2004-86855, and is a well-known method.

Figure 7:
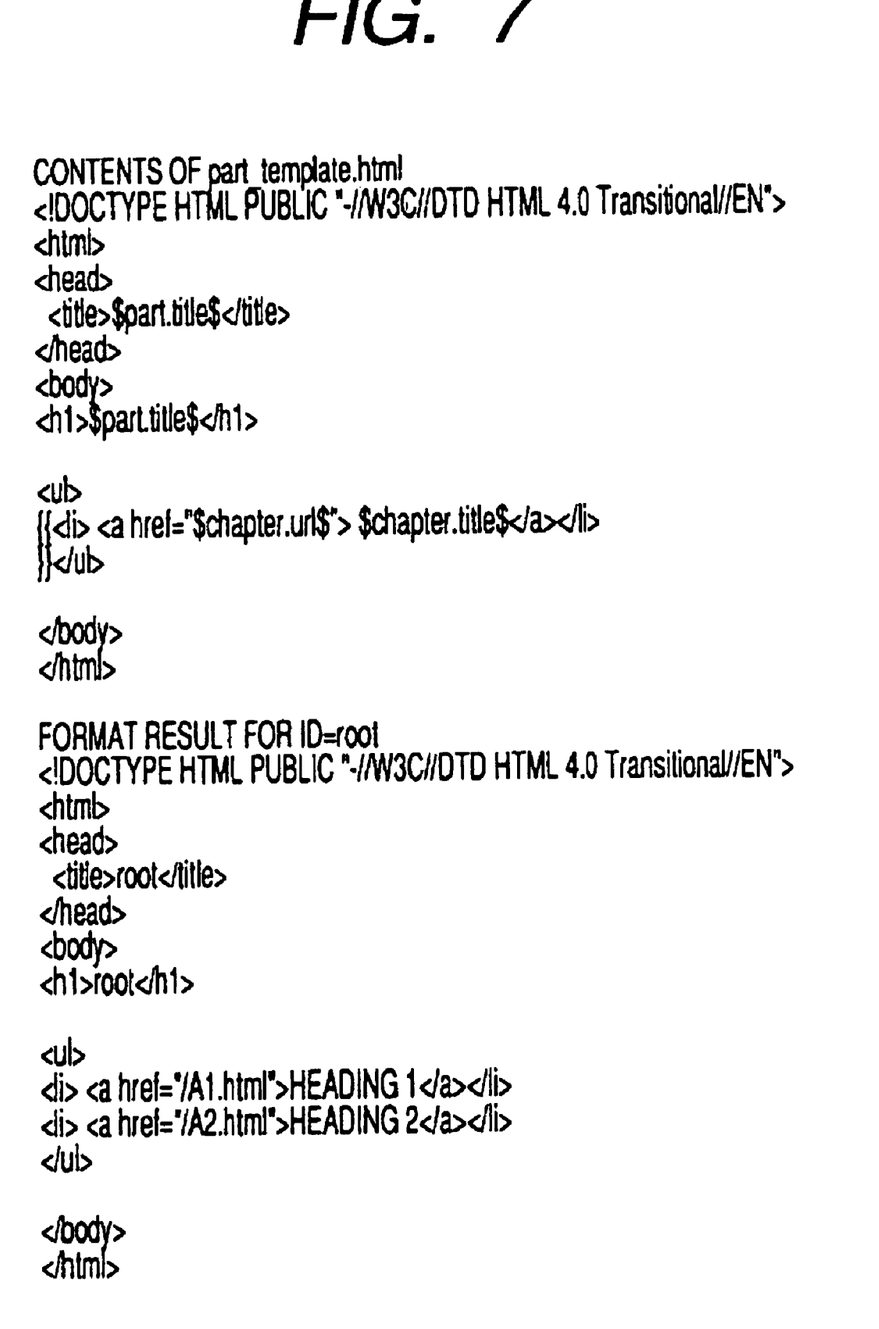
FIG. 7 is a view showing an example of a result of conversion into an HTML file by using a template file executed by a layout information creation part shown in FIG. 1.
Figure 8:
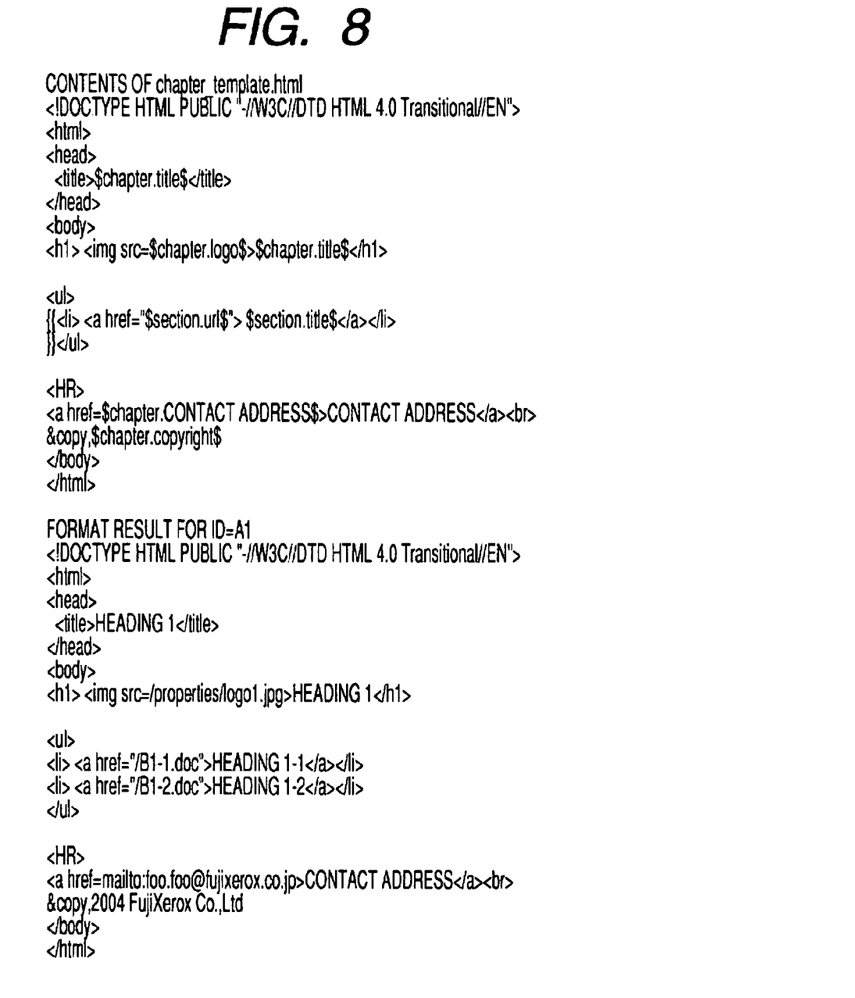
FIG. 8 is a view showing an example of a result of conversion into an HTML file by using a template file executed by the layout information creation part shown in FIG. 1.

FIGS. 7 and 8 show examples of results of the conversion into the HTML file executed by the layout information creation part 18 using the template file. FIG. 7 shows the content of a template file "part_template.html" and the conversion result of the root directory obtained by using that. FIG. 8 shows the content of a template file "chapter_template.html" and the conversion result of the node, in which the "ID" is Al, obtained by using that.

Next, a modified example of the editing method of the metadata and the content data will be described. In the case where metadata and content data are initially registered, directory information is recited in the format of the contextual structure information table shown in FIG. 6, and may be stored, together with a file, into the storage part 22 in a collective manner. In that case, it is necessary that the contextual structure information table of the exemplified format is made one of a pair, and a file corresponding to a file name specified by an href attribute value of a line corresponding to the file object in the contextual structure information table, together with the metadata and the content data, is stored. For that purpose, the contextual structure information table and the file are together specified in, for example, the format of multi-part form data of HTTP, and are transmitted to the metadata base. Although the contextual structure information table is not limited as long as it has a table format, registration may be performed by, for example, a well-known CSV format. In a file other than that, a multi-part content-disposition attribute is specified as a file name. For example, in test.doc, a following entity header is set, and the entity of the file is specified as body information and is registered (format regulated by RFC 2045-Multipurpose Internet Mail Extensions (MIME)) content-disposition: form-data; name="test.doc"

In the storage part 22, an HTTP request is analyzed, the metadata and the content data are created from the table of the contextual structure information table format, and the folder object, the link object, the file object, the shortcut object, and the content data are respectively created as XML files and are stored. The member information of the folder object creates a unique entity reference, and as exemplified by E0.xml, E1.xml, and E2.xml shown in the former example, it is described in the XML file and is stored in the storage part 22.

According to the above structure, the information of the Web site is separated into the metadata and the content data and can be managed, the metadata and the content data can be independently edited, and the HTML is constructed by combining the metadata and the content data. Thus, it becomes unnecessary to directly edit the HTML unlike the related art, and the site information can be easily changed.

As described above, some embodiments of the invention are outlined below.

In the storage medium readable by a computer, the storage medium stores a program of instructions executable by the computer to perform a function for supporting editing of a hierarchical structure of a directory, and the function includes: editing metadata including information relevant to the hierarchical structure of the directory; editing content data as contents of a document; analyzing the metadata; and creating a new hierarchical structure of the directory on the basis of a result of the analysis and the content data.

Here, the information relevant to the hierarchical structure of the directory may include a heading to be embedded in a reference source and address information of a reference destination.

Besides, the hierarchical structure of the directory may be a hyperlink structure between documents.

In the directory editing support method for supporting editing of a hierarchical structure of a directory by a computer, the method includes: editing metadata including information relevant to the hierarchical structure of the directory; editing content data as contents of a document; analyzing the metadata; and creating a new hierarchical structure of the directory on the basis of a result of the analysis and the content data.

In the directory editing support apparatus for supporting editing of a hierarchical structure of a directory, the apparatus includes: a metadata editing unit that edits metadata including information relevant to the hierarchical structure of the directory; a content data editing unit that edits content data as contents of a document; a metadata analysis unit that analyzes the metadata edited by the metadata editing unit; and a directory editing unit that creates a new hierarchical structure of the directory on the basis of an analysis result of the metadata editing unit and the content data.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2004-322787 filed on Nov. 5, 2004 including specification, claims, drawings and abstract is incorporated herein by reference in its entirety.

What is claimed is:

1. A computer-readable storage medium, the storage medium storing a program of instructions executable by the computer to perform a function for supporting editing of a hierarchical structure of a directory, the function comprising:

storing a first piece of content data from a first file of the directory having a hierarchical structure, the first file containing both content data and metadata, in a first content file;

storing a second piece of content data from a second file of the directory having a hierarchical structure, the second file containing both content data and metadata, in a second content file;

storing a first piece of metadata from the first file of the directory having a hierarchical structure in a first metadata file;

storing a second piece of metadata from the second file of the directory having a hierarchical structure in a second metadata file;

creating a site XML file having contextual structure information, the site XML file reflecting the hierarchical structure of the directory in part by combining the content data from the first and second content files and the metadata from the first and second metadata files into an XML file;

analyzing the site XML file by separating the contextual structure information into component parts; and converting the site XML file into two or more arrangement files based on the component parts of the contextual structure information, wherein creating a site XML file reflecting the hierarchical structure includes:

reading out an XML file of a root directory corresponding to the directory;

parsing the XML file of the root directory;

checking whether a first entity reference exists in the XML file of the root directory;

reading out an XML file corresponding to the first entity reference when the first entity reference is found;

checking whether a second entity reference exists in the XML file corresponding to the first entity reference;

reading out an XML file corresponding to the second entity reference when the second entity reference is found;

erasing the first entity reference when the first entity reference does not exist in the XML file of the root directory; and erasing the second entity reference when the second entity reference does not exist in the XML file corresponding to the first entity reference, wherein at least one processor performs at least one of the steps.

2. The physical storage medium storing the program according to claim 1, wherein the metadata in the first and second metadata files include a heading to be embedded in a reference source and address information of a reference destination.

3. A directory editing support method for supporting editing of a hierarchical structure of a directory by a computer, comprising:

storing a first piece of content data from a first file of the directory having a hierarchical structure, the first file containing both content data and metadata, in a first content file;

storing a second piece of content data from a second file of the directory having a hierarchical structure, the second file containing both content data and metadata, in a second content file;

storing a first piece of metadata from the first file of the directory having a hierarchical structure in a first metadata file;

storing a second piece of metadata from the second file of the directory having a hierarchical structure in a second metadata file;

creating a site XML file having contextual structure information, the site XML file reflecting the hierarchical structure of the directory in part by combining the content data from the first and second content files and the metadata from the first and second metadata files into an XML file;

analyzing the site XML file by separating the contextual structure information into component parts;

converting the site XML file into two or more arrangement files based on the component parts of the contextual structure information, wherein creating a site XML file reflecting the hierarchical structure includes:

reading out an XML file of a root directory corresponding to the directory;

parsing the XML file of the root directory;

checking whether a first entity reference exits in the XML file of the root directory;

reading out an XML file corresponding to the first entity reference when the first entity reference is found;

checking whether a second entity reference exists in the XML file corresponding to the first entity reference;

reading out an XML file corresponding to the second entity reference when the second entity reference is found;

erasing the first entity reference when the first entity reference does not exist in the XML file of the root directory; and erasing the second entity reference when the second entity reference does not exist in the XML file corresponding to the first entity reference, wherein at least one processor performs at least one of the steps.

4. The directory editing support method according to claim 3, wherein the metadata in the first and second metadata files include a heading to be embedded in a reference source and address information of a reference destination.

5. A physical directory editing support apparatus for supporting editing of a hierarchical structure of a directory, comprising:

at least one processor;

a storage part for:

storing a first piece of content data from a first file of the directory having a hierarchical structure, the first file containing both content data and metadata, in a first content file;

storing a second piece of content data from a second file of the directory having a hierarchical structure, the second file containing both content data and metadata, in a second content file;

storing a first piece of metadata from the first file of the directory having a hierarchical structure in a first metadata file;

storing a second piece of metadata from the second file of the directory having a hierarchical structure in a second metadata file;

a metadata analysis part that analyzes the first and second metadata files; a layout information creation part for creating a site XML file having contextual structure information, the site XML file reflecting the hierarchical structure of the directory in part by combining the content data from the first and second content files and the metadata from the first and second metadata files into an XML file;

an analyzing part that analyzes the site XML file by separating the contextual structure information of the component parts; and converting the site XML file into two or more arrangement files based on the component parts of the contextual structure information, wherein:

the metadata analysis part reads out an XML file of a root directory corresponding to the directory;

the metadata analysis part parses the XML file of the root directory;

the metadata analysis parts checks whether a first entity reference exists in the XML file of the root directory;

the metadata analysis part reads out an XML file corresponding to the first entity reference when the first entity reference is found;

the metadata analysis part checks whether a second entity reference exists in the XML file corresponding to the first entity reference;

the metadata analysis part reads out an XML file corresponding to the second entity reference when the second entity reference is found;

erasing the first entity reference when the first entity reference does not exist in the XML file of the root directory;

erasing the second entity reference when the second entity reference does not exist in the XML file corresponding to the first entity reference; and wherein at least one of the parts is connected to the at least one processor.

6. The physical directory editing support apparatus according to claim 5, wherein the metadata in the first and second metadata files include a heading to be embedded in a reference source and address information of a reference destination.

* * * * *